(12) United States Patent
Matheson

(10) Patent No.: US 9,302,325 B2
(45) Date of Patent: Apr. 5, 2016

(54) DOUBLE CUT SINGLE POINT CUTOFF TOOL FOR CUTTING AND FINISHING AN END SURFACE OF A FUEL INJECTOR POLE PIECE

(71) Applicant: Continental Automotive Systems, Inc., Auburn Hills, MI (US)

(72) Inventor: Traynham G. Matheson, Seaford, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 71 days.

(21) Appl. No.: 14/077,540

(22) Filed: Nov. 12, 2013

(65) Prior Publication Data

US 2015/0132493 A1    May 14, 2015

(51) Int. Cl.
  *B23D 21/00*  (2006.01)
  *B23B 27/04*  (2006.01)
  *B23D 21/04*  (2006.01)

(52) U.S. Cl.
  CPC ........... *B23B 27/04* (2013.01); *B23B 2220/445* (2013.01); *Y10T 82/10* (2015.01); *Y10T 407/23* (2015.01)

(58) Field of Classification Search
  CPC .................................. B23B 5/167; B23B 5/16
  See application file for complete search history.

(56) References Cited

U.S. PATENT DOCUMENTS

| | | | | |
|---|---|---|---|---|
| 2,616,325 A | * | 11/1952 | Abbey | 82/130 |
| 2,679,679 A | * | 6/1954 | Metzler | 407/117 |
| 2,770,936 A | * | 11/1956 | Clark | 156/582 |
| 3,563,119 A | * | 2/1971 | Shashaty | 82/173 |
| 3,765,785 A | * | 10/1973 | Humphreys et al. | 408/1 R |
| 4,126,064 A | * | 11/1978 | Tarrant | 82/1.11 |
| 2003/0049126 A1 | * | 3/2003 | Uematsu et al. | 416/97 R |

FOREIGN PATENT DOCUMENTS

DE        3612960 A1 * 10/1986 ............... B23B 5/14

* cited by examiner

*Primary Examiner* — Will Fridie, Jr.

(57) ABSTRACT

A method removes a fuel injector pole piece from bar stock and provides a cutoff tool having a first cutting surface and a second cutting surface separate from the first cutting surface. The pole piece and bar stock are caused to rotate about a longitudinal axis. The tool is advanced with respect to the pole piece so that the first cutting surface severs the pole piece from the bar stock and defines an unfinished end surface of the pole piece, with a certain cutting force being exerted on the tool. The tool is further advanced with respect to the pole piece so that the second cutting surface removes material from the unfinished end surface to define a finished end surface of the pole piece, with a cutting force on the tool being substantially less than the certain cutting force.

16 Claims, 6 Drawing Sheets

DOUBLE CUT SINGLE POINT CUTOFF TOOL FOR CUTTING AND FINISHING AN END SURFACE OF A FUEL INJECTOR POLE PIECE

FIELD

The invention relates to fuel injectors of internal combustion engines for vehicles and, more particularly, to a cutoff tool to provide a single pointed finished surface for an impact face of a pole piece of a fuel injector.

BACKGROUND

Current production of pole pieces of fuel injectors has fallout for flaky chrome plating due to poor plating adhesion on the impact face of the pole piece. With reference to FIG. 1, the poor adhesion is due to a poor finish at an end surface 10 of the pole piece 1, which is generated by the conventional cutoff tool. As shown in FIG. 2, the conventional cutoff tool 14 is a carbide cutting tool that cuts the finished part off of a rotating bar stock 16. As shown in FIG. 3, the conventional cutoff tool 14 has a 90° geometry defining cutting edge 18 which makes a single cut on the pole piece 12. During this operation there are very high cutting forces acting on the tool 14 due to the very high feed rates (rate at which to tool cuts the part). These high forces cause the tool 14 to move towards and away from the from end surface 10 during the cutting operation and this movement causes the finished part specifications (i.e., flatness and face runout) not meet the expected specifications. The conventional cutoff tool 14 is specifically designed to keep it from moving during the cut but, due to its configuration, the tool 14 rubs (tears/smears) along the end surface 10 creating a poor finish.

Thus, there is a need to provide a new cutoff tool configuration that creates an improved single pointed surface (consistent peak-to-valley) while meeting the part flatness and face runout specifications, so as to improve the surface finish and therefore increase chrome plating adhesion on a pole piece.

SUMMARY

An object of the invention is to fulfill the need referred to above. In accordance with the principles of an embodiment, this objective is obtained by a method for removing a fuel injector pole piece from bar stock. The method provides a cutoff tool having a first cutting surface and a second cutting surface separate from the first cutting surface. The pole piece and bar stock are caused to rotate about a longitudinal axis. The tool is advanced with respect to the pole piece so that the first cutting surface severs the pole piece from the bar stock and defines an unfinished end surface of the pole piece, with a certain cutting force being exerted on the tool. The tool is further advanced with respect to the pole piece so that the second cutting surface removes material from the unfinished end surface to define a finished end surface of the pole piece, with a cutting force on the tool being substantially less than the certain cutting force.

In accordance with another aspect of an embodiment, a cutoff tool is provided for cutting a work piece from rotating bar stock. The tool includes a body, a first cutting surface on the body, and a second cutting surface on the body and separate from the first cutting surface. The first cutting surface is constructed and arranged such that as the tool is advanced with respect to the work piece, the first cutting surface severs the work piece from the bar stock and defines an unfinished end surface of the work piece, with a certain cutting force being exerted on the tool. The second cutting surface is constructed and arranged such that as the tool is advanced further with respect to the work piece, the second cutting surface removes material from the unfinished end surface to define a finished end surface of the work piece, with a cutting force on the tool being substantially less than the certain cutting force.

Other objects, features and characteristics of the embodiments, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The embodiments will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
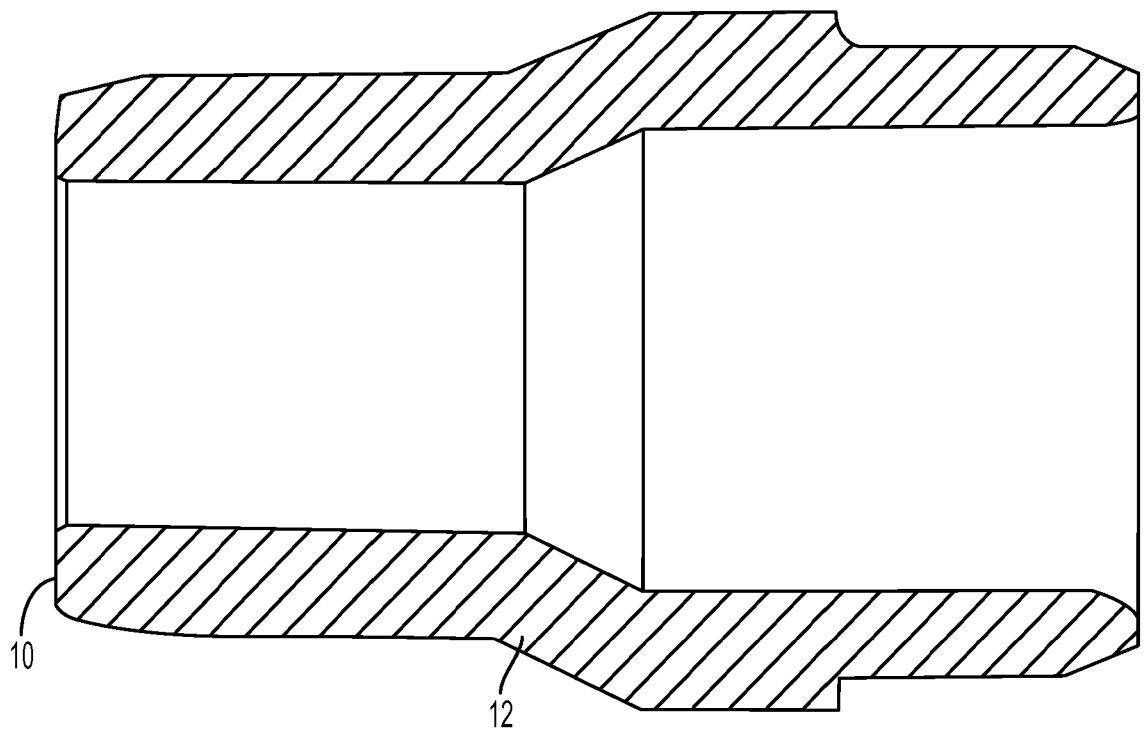
FIG. 1 is an enlarged view of a conventional pole piece for a fuel injector having an end surface cut by a conventional cutoff tool.
Figure 2:
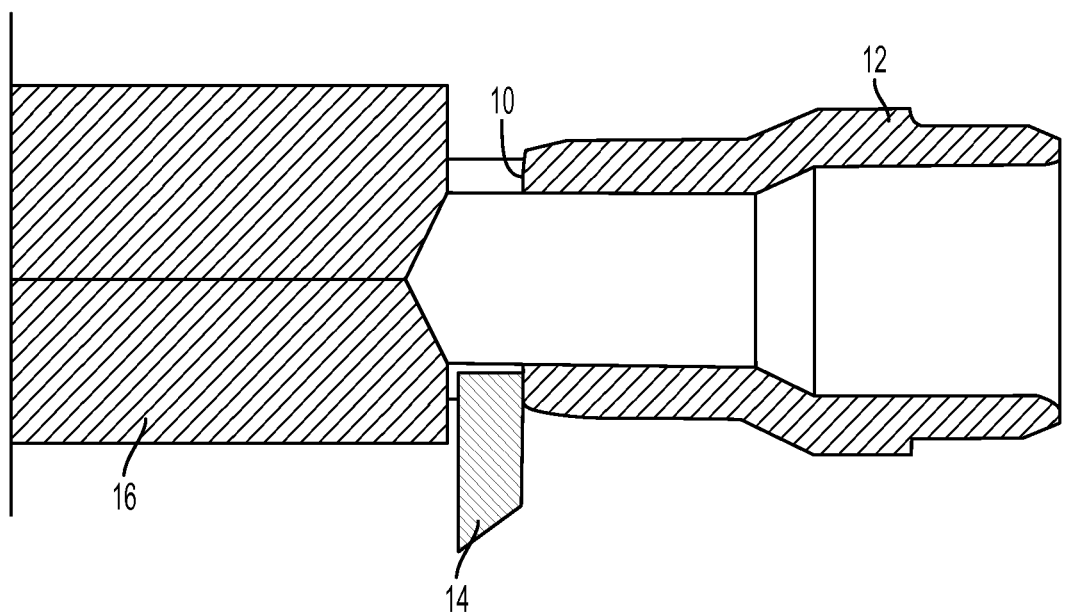
FIG. 2 is a view of a conventional cutoff tool cutting the end surface of the pole piece of FIG. 1 from bar stock.
Figure 3:
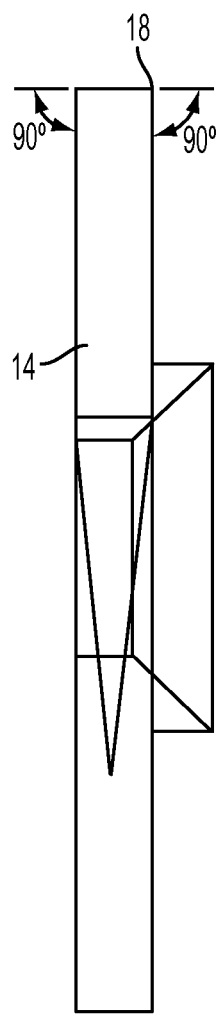
FIG. 3 is a view of the conventional cutoff tool of FIG. 2.
Figure 4:
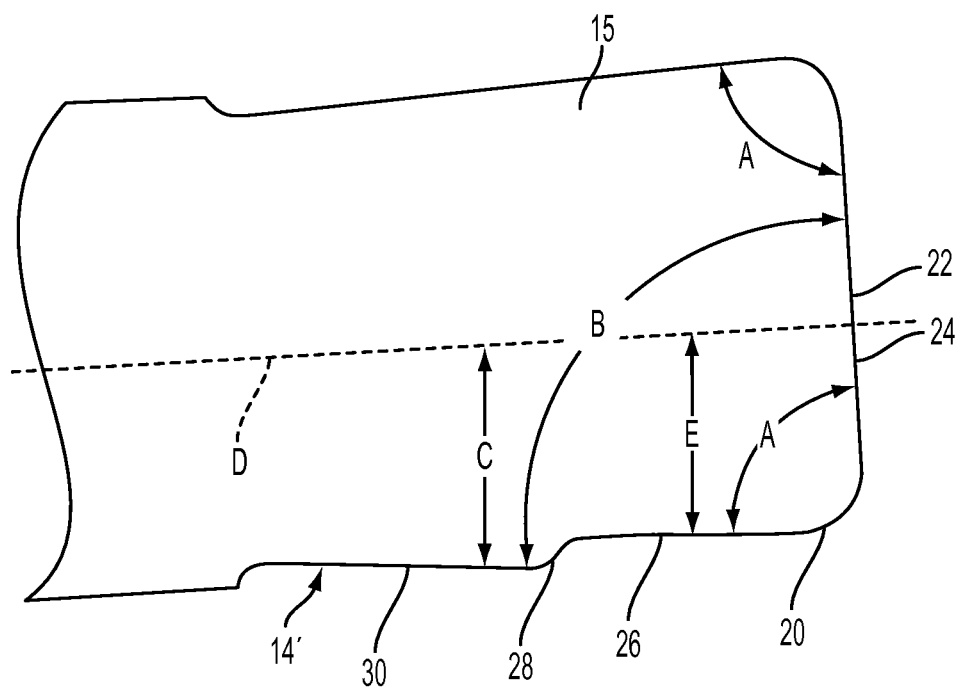
FIG. 4 is top view of an end of a cutoff tool in accordance with an embodiment.
Figure 5:
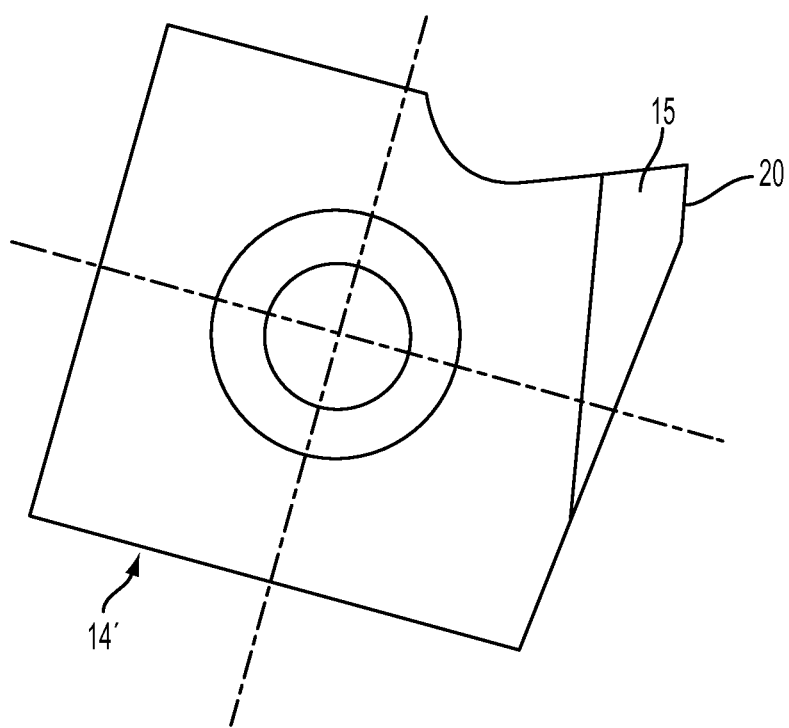
FIG. 5 is a side view of the cutoff tool of the embodiment.

With reference to FIGS. 4 and 5, a cutoff tool is shown, generally indicated at 14', in accordance with an embodiment. The tool 14' is similar to the tool 14 of FIG. 3, but includes two cutting surfaces on single body 15. A top view of a portion of the cutoff tool 14' is shown in FIG. 4. A first cutting surface 20 is provided at a distal end 22 of the tool 14'. The cutting surface 20 is located between a first edge 24 and a second edge 26, with an angle A defined between the edges 24 and 26. The first edge 24 is disposed generally transversely with respect to a longitudinal axis D of the tool 14, and the second edge 26 is disposed generally parallel to the axis D. In the embodiment, angle A is about 88°. The first cutting surface 20 is defined by a radius surface between the first edge 24 and the second edge 26. The size of the radius in the embodiment is about .008 inches.

The tool 14' also includes a second cutting surface 28 spaced axially from the distal end 22 and separate from the first cutting surface 20. As shown in FIG. 4, the second cutting surface 28 is preferably a radius surface (radius of about .008 inches) defined between the second edge 26 and a third edge 30 of the tool 14'. The third edge 30 extends a distance C from axis D, which is greater than a distance E that second edge 26 extends radially from the axis D. In the embodiment, the difference between the E and C distances is about .002 inches. Also, an angle B defined between the edges 24 and 30 is about 86°.

Figure 6A:
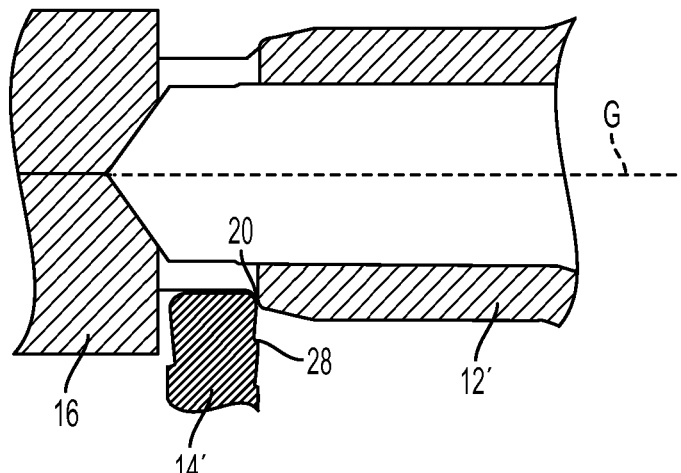
FIG. 6A shows the end of the cutoff tool of FIG. 4 starting to cut an end surface of a pole piece of a fuel injector in accordance with an embodiment.
Figure 6B:
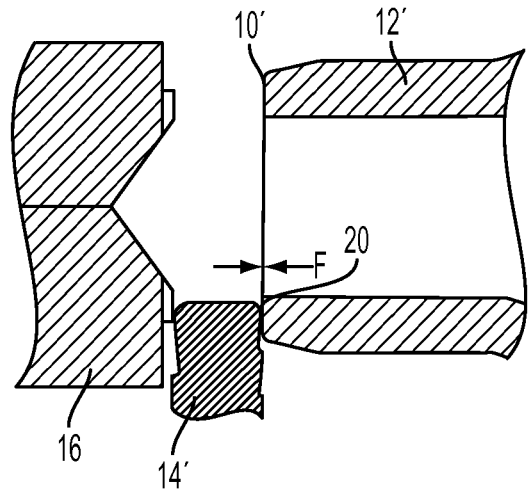
FIG. 6B shows the end of the cutoff tool of FIG. 6A making a first cut.
Figure 6C:
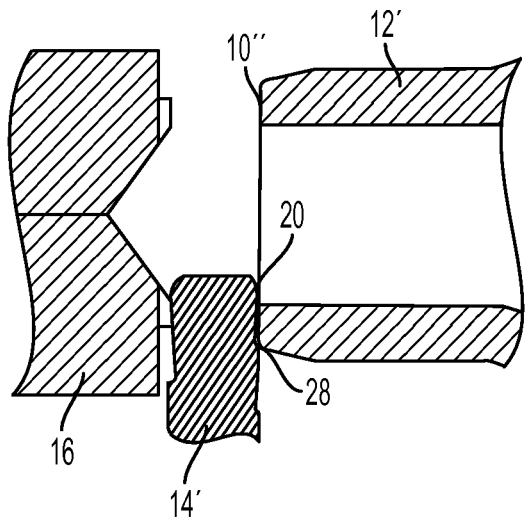
FIG. 6C shows the end of the cutoff tool of FIG. 6B making a second and final cut.

The cutoff tool 14' is constructed and arranged to cut an end surface of a work piece, such as the pole piece 12', using the two different cutting surfaces 20, 28. With reference to FIGS. 6A-6C, during the last operation in the machining process, the pole piece 12' is ready to be severed or removed from the bar stock 16. A pickoff collet (not shown) clamps on the outside diameter of the pole piece 12', holding it while a bar stock collet (not shown) holds the steel bar stock 16 during rotation via a lathe. With reference to FIG. 6A, the tool 14' is shown at a location for starting cutting the pole piece 12' of a fuel injector from the bar stock 16 during rotation of the bar stock 16 and pole piece 12'. FIG. 6B shows the tool 14' advancing radially with respect to the longitudinal axis G of the pole piece 12' so that the first cutting surface 20 severs the pole piece 12' from the bar stock 16 and defines an unfinished end surface 10'. The first cutting edge leaves about 0.050 mm (shown at F in FIG. 6B) of material on the unfinished end surface 10' to be removed by the second cutting surface 28. With the pickoff collet still holding onto the pole piece 12', the tool 14' is further advanced radially so that the second cutting surface 28 removes the 0.050 mm of material and produces a single pointed (consistent peak-to-valley distances of grooves left by the tool) finished end surface 10" (FIG. 6C). This finished end surface 10" is consistent, without any tearing. The high cutting force acts on the tool 14' when the first cutting surface 20 cuts the pole piece 12'. During the second (finish) cut, the cutting force on the tool 14' is substantially less, since the only force acting on the tool 14' is the removal of the 0.050 mm material. After the second cut, the finished end surface 10" has a profile of a line of about 0.018 mm and a runout of about 0.010 mm.

The cutoff tool 14' thus creates an improved single pointed finished end surface 10" while meeting the flatness and face runout specifications. The pole piece 12' is preferably of the type disclosed in Patent Application Publication No. US 2002/0138983 A1, the content of which is hereby incorporated by reference into this specification. The finished end surface 10" that may impact an armature of the fuel injector is then chrome plated. Thus, the cutoff tool 14' improves the surface finish of the end surface 10" and therefore increases chrome plating adhesion thereon. This significantly reduces scrap due to reduced chrome flaking.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of removing a fuel injector pole piece from bar stock, the method comprising:
    providing a cutoff tool having a first cutting surface and a second cutting surface separate from the first cutting surface,
    causing rotation of the pole piece and bar stock about a longitudinal axis,
    advancing the tool with respect to the pole piece so that the first cutting surface severs the pole piece from the bar stock and defines an unfinished end surface of the pole piece, with a certain cutting force being exerted on the tool, and
    further advancing the tool with respect to the pole piece so that the second cutting surface removes material from the unfinished end surface to define a finished end surface of the pole piece, with a cutting force on the tool being substantially less than the certain cutting force.

2. The method of claim 1, during the further advancing step, the second cutting surface removes about 0.050 mm of the material.

3. The method of claim 1, wherein the advancing steps include advancing the tool radially with respect to the longitudinal axis.

4. The method of claim 1, wherein the finished end surface has a generally consistent peak to valley distances of grooves left by the tool.

5. The method of claim 1, further comprising chrome plating the finished end surface.

6. A method of removing a fuel injector pole piece from bar stock, the method comprising:
    providing a cutoff tool having a first cutting surface and a second cutting surface separate from the first cutting surface,
    causing rotation of the pole piece and bar stock about a longitudinal axis,
    advancing the tool with respect to the pole piece so that the first cutting surface severs the pole piece from the bar stock and defines an unfinished end surface of the pole piece, with a certain cutting force being exerted on the tool, and
    further advancing the tool with respect to the pole piece so that the second cutting surface removes material from the unfinished end surface to define a finished end surface of the pole piece, with a cutting force on the tool being substantially less than the certain cutting force,
    wherein the providing step includes defining the first cutting surface as a radius surface between a first edge and a second edge at a distal end of the tool, the first edge being disposed generally transversely with respect to a longitudinal axis of the tool, and the second edge being disposed generally parallel to the longitudinal axis of the tool.

7. The method of claim 6, wherein the providing step includes spacing the second cutting surface axially from the distal end, and wherein the second cutting surface is a radius surface defined between the second edge and a third edge of the tool.

8. The method of claim 7, wherein the third edge extends a distance from the longitudinal axis of the tool greater than a distance that the second edge extends from the longitudinal axis of the tool.

9. The method of claim 7, wherein the size of each radius surface is about 0.008 inches.

10. The method of claim 1, wherein the finished end surface has a profile of a line of about 0.018 mm and a runout of about 0.010 mm.

11. A cutoff tool for cutting a work piece from rotating bar stock, the tool comprising:
    a body,
    a first cutting surface on the body, and
    a second cutting surface on the body and separate from the first cutting surface,
    the first cutting surface being constructed and arranged such that as the tool is advanced with respect to the work piece, the first cutting surface severs the work piece from the bar stock and defines an unfinished end surface of the work piece, with certain a cutting force being exerted on the tool, and
    the second cutting surface being constructed and arranged such that as the tool is advanced further with respect to the work piece, the second cutting surface removes material from the unfinished end surface to define a finished end surface of the work piece, with a cutting force on the tool being substantially less than the certain cutting force.

12. A cutoff tool for cutting a work piece from rotating bar stock, the tool comprising:

a body, a first cutting surface on the body, and a second cutting surface on the body and separate from the first cutting surface, the first cutting surface being constructed and arranged such that as the tool is advanced with respect to the work piece, the first cutting surface severs the work piece from the bar stock and defines an unfinished end surface of the work piece, with certain a cutting force being exerted on the tool, and the second cutting surface being constructed and arranged such that as the tool is advanced further with respect to the work piece, the second cutting surface removes material from the unfinished end surface to define a finished end surface of the work piece, with a cutting force on the tool being substantially less than the certain cutting force, wherein the first cutting surface includes a radius surface between a first edge and a second edge at a distal end of the tool, the first edge being disposed generally transversely with respect to a longitudinal axis of the tool, and the second edge being disposed generally parallel to the longitudinal axis of the tool.

13. The tool of claim 12, wherein the second cutting surface is spaced axially from the distal end, and wherein the second cutting surface is a radius surface defined between the second edge and a third edge of the tool.

14. The tool of claim 13, wherein the third edge extends a distance from the longitudinal axis of the tool greater than a distance that the second edge extends from the longitudinal axis of the tool.

15. The tool of claim 12, wherein an angle between the first and second edges is about 88°.

16. The tool of claim 13, wherein an angle between the first and third edges is about 86°.

\* \* \* \* \*